(12) United States Patent
Santana da Costa et al.

(10) Patent No.: US 8,621,267 B2
(45) Date of Patent: Dec. 31, 2013

(54) EXTENDED PAGE PATCHING

(75) Inventors: Alexandre Santana da Costa, Redmond, WA (US); Umair Ahmad, Redmond, WA (US); Brett A. Shirley, Bellevue, WA (US); Matthew G. Gossage, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 12/968,478

(22) Filed: Dec. 15, 2010

(65) Prior Publication Data

US 2012/0159262 A1   Jun. 21, 2012

(51) Int. Cl.
*G06F 11/00* (2006.01)

(52) U.S. Cl.
USPC ........... 714/6.12; 714/4.1; 714/4.4; 714/6.11; 714/6.3; 714/6.31; 714/21; 714/49; 714/54; 714/763; 714/764

(58) Field of Classification Search
USPC ........... 714/4.1, 4.4, 6.11, 6.12, 6.3, 6.31, 21, 714/49, 54, 763, 764
See application file for complete search history.

(56) References Cited

U.S. PATENT DOCUMENTS

| 5,392,290 | A * | 2/1995 | Brown et al. | 714/6.12 |
|---|---|---|---|---|
| 7,143,120 | B2 | 11/2006 | Oks et al. | |
| 7,636,741 | B2 | 12/2009 | Kulesza et al. | |
| 7,653,840 | B1 * | 1/2010 | Taylor et al. | 714/47.2 |
| 7,689,607 | B2 | 3/2010 | Oks et al. | |
| 7,711,716 | B2 | 5/2010 | Stonecipher | |
| 7,748,000 | B2 * | 6/2010 | Genty et al. | 717/176 |
| 7,958,390 | B2 * | 6/2011 | Bosch et al. | 714/6.13 |
| 7,966,518 | B2 * | 6/2011 | Bosch et al. | 714/6.13 |
| 8,001,417 | B2 * | 8/2011 | Byrne et al. | 714/6.13 |
| 2006/0224636 | A1 | 10/2006 | Kathuria et al. | |
| 2006/0235909 | A1 * | 10/2006 | Oks et al. | 707/204 |
| 2007/0168708 | A1 * | 7/2007 | McCuller | 714/6 |
| 2008/0285365 | A1 * | 11/2008 | Bosch et al. | 365/200 |
| 2009/0055682 | A1 * | 2/2009 | Gibson et al. | 714/6 |
| 2012/0266044 | A1 * | 10/2012 | Hu et al. | 714/763 |

OTHER PUBLICATIONS

Alves, Jul. 2, 2010, "Database Availability Groups", 12pages, http://blogs.technet.com/b/sjimmie/archive/2010/07/02/database-availability-groups.aspx.
MSDN, Retrieved Oct. 12, 2010, "Automatic Page Repair During a Database Mirroring Session", 2 pages, http://msdn.microsoft.com/en-us/library/bb677167.aspx.
Bobluisusa, Retrieved Oct. 12, 2010, "Repair EDB", 1 page, htp://hubpages.com/hub/repair-edb-file.
Retrieved Oct. 12, 2010, "Mail Recovery", 2 pages, http://ntfs-recovery.com/mail_recovery/mail_recovery.php.

* cited by examiner

*Primary Examiner* — Joshua P Lottich
(74) *Attorney, Agent, or Firm* — Merchant & Gould P.C.

(57) ABSTRACT

The embodiments described herein generally relate to methods and systems for using an extended patching procedure for correction or repair of logical data portions, pages, or sectors of a computer data storage device. The extended patching procedure targets for repair not only the page(s) appearing to be defective or unusable based on a failed read operation for a data transfer request, but also additional pages. Determining the additional pages to include for automatic patching is based on: statistical distribution analyzes to include pages within the physical or logical vicinity of the original page, information about the underlying storage device technology or Input/Output (I/O) subsystem, and/or historical data about error conditions for areas related to the original page. Pre-emptively patching pages based on extended page lists improves system performance by reducing the total number of costly repair processes and by avoiding situations involving correction actions that fail to resolve.

20 Claims, 13 Drawing Sheets

EXTENDED PAGE PATCHING

BACKGROUND

Computer data storage devices often have unusable logical data portions. Such unusable logical data portions, or pages, may be corrupt or defective. Corruption may be physical or logical. For example, hard disk defects may be present from errors or problems in the manufacturing process of such disks. Damage may also be incurred in the post-manufacturing handling, transport, and/or improper use of disk devices, for example. Failure may also occur after deployment of the disk devices. Such damage, failure, errors, or problems may impact an entire storage device or logical data portions thereof. While defective areas of a storage device may be repaired, the performance and overall efficiency of the system utilizing such a device tends to suffer from the increasing consumption of resources, e.g., bandwidth, resulting from the correction procedure itself. Further, in some situations, the correction procedure is not triggered at all. Such complete failure of the correction procedure may halt, or at least hamper, overall system functionality altogether and thus compromise the expected behavior of the system. Further yet, problems with system performance resulting from defects in portions of the storage device may be exacerbated where storage system software in different layers of the data transfer process either combines or preemptively expands read operations for data requests in an attempt to achieve better performance. With such expanded read operations, faulty or defective pages in the expanded request may cause an error or other indication of a defect in the data transfer response. As a result, the originally requested pages may appear to be defective when they in fact are not. Such false failure results may cause valid or intact pages to undergo costly correction procedures, while the defective pages slip under the radar of repair and continue to cause the correction process to fail and compromise system performance.

Although specific problems have been addressed in this Background, this disclosure is not intended in any way to be limited to solving those specific problems.

SUMMARY

Embodiments generally relate to applying a correction procedure for one or more unusable, or defective, logical data portions of a computer data storage device, in which such correction procedure comprises an extended patching procedure. Logical data portions of a computer data storage device may be referred to herein as "pages" or "sectors." With an extended patching procedure, the page that was explicitly requested from the computer data storage device, and is found to be defective or corrupt, is not the only page that is patched, or repaired. Rather, a reasonable number of related additional pages are also patched such that future attempts to read data from such pages will have a significantly lower probability of failure. Such an extended patching procedure is used to preemptively repair additional pages of the computer data storage device to lead to more efficient future accesses of the pages that are targeted for correction by the extended patching procedure. By preemptively repairing an extended list of pages, only one, or at least a minimized number of, repair event(s) is needed. Because a repair event, in most instances, is an event of non-optimal behavior for the involved system due to reduced performance or system downtime during the repair process, minimizing the number of repair events results in efficiency gains for the overall system.

In embodiments, extending the patching to include related additional pages comprises those pages in the logical or physical vicinity of an unusable page. For example, an extended patching may span a geometric segment on a disk or portion of a disk platter, where a magnetic rotating platter is used for data storage, for example. Such rationale for including related additional pages is based, in embodiments, on a statistical probability analysis that having a defective page on a given physical region of a computer data storage device is higher if pages were found to be unusable in the vicinity of the page. In other embodiments, an optimal or most suitable extended page list on which to perform the actual repair procedure is based on information regarding the underlying data storage device technology or input/output (I/O) subsystem. In such embodiments, the additional list or set of pages may or may not be in the physical or logical vicinity of the originally requested page. In yet further embodiments, historical data about error conditions occurring in areas related to the page originally targeted for repair is used to determine the optimal or most suitable extended page list on which to perform the actual repair procedure. The specific technique of extending the range for page patching may be thus related to the particular type of storage device(s) involved. As used throughout this disclosure, discussions about a "range" or a "list" correspond to a series or a set of items, such as pages. These words may be used interchangeably throughout the disclosure.

Further, embodiments provide for applying an extended patching procedure where the originally requested page is not in fact defective but, instead, appears to be defective or unusable based on a combined or preemptively expanded data request that attempts to retrieve more pages than those originally requested. In such situations, the repair procedure is performed on the valid pages instead of the actual defective pages because the data requestor is aware only that the read operation has failed and does not know that the reason for failure was a combined or expanded data request that pulled defective, although not requested, pages with the originally requested pages. By applying an extended patching procedure that preemptively repairs all pages related to the originally requested page(s), the actual defective, although unknown, page(s) are thus repaired with extended patching, and the correction action is able to complete successfully.

In performing the repair procedure, embodiments also provide for isolating a list of pages in the computer data storage device to prevent future failures that may result from other corrupt or defective pages. With isolated lists of pages, data is written to a different location of the computer data storage device. The performance and efficiencies of the overall computer data storage device are improved by not consuming bandwidth and other resources associated with costly repairs.

This Summary is provided to introduce a selection of concepts in a simplified form that is further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

Embodiments of the present disclosure may be more readily described by reference to the accompanying drawings in which like numerals refer to like items.

DETAILED DESCRIPTION

Figure 1:
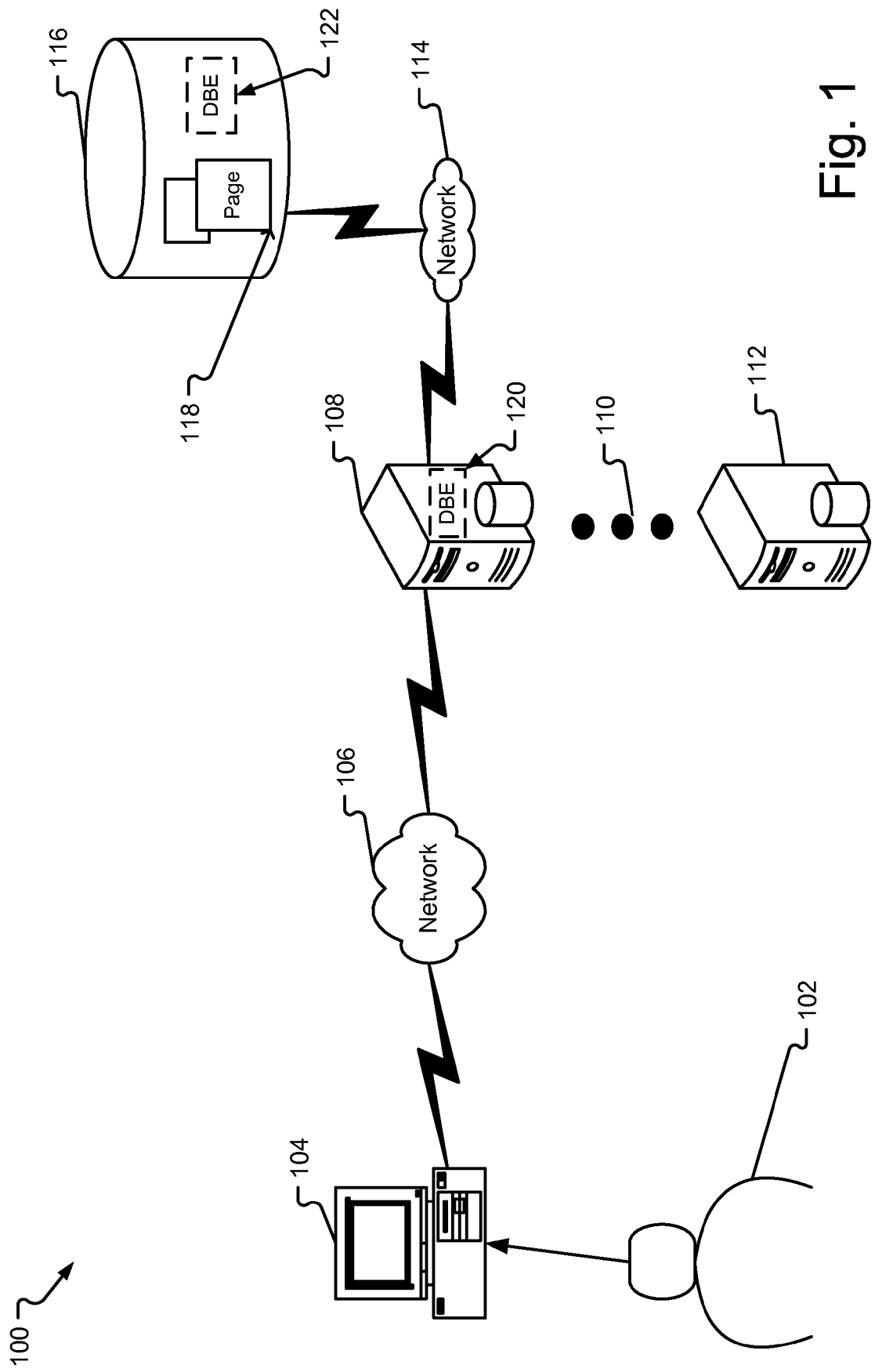
FIG. 1 illustrates an example logical representation of an environment or system for retrieving a logical data portion(s), i.e., a page(s), of a computer data storage device and performing extended page patching in accordance with embodiments disclosed herein.

This disclosure will now more fully describe example embodiments with reference to the accompanying drawings, in which specific embodiments are shown. Other aspects may, however, be embodied in many different forms, and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations.

Embodiments generally relate to applying an extended patching procedure to repair logical data portions, i.e., pages, of a computer data storage device. For example, the logical data portions may be subject to an error, such as but not limited to an Unrecoverable Read Error ("URE"). The extended patching procedure comprises patching, or repairing or applying a correction action to, not only the page(s) originally requested in the data transfer request, but also patching a defined number of additional pages. Thus, pages that were not necessarily found to be unusable are automatically patched with the extended page patching procedure. By patching a defined number of pages in addition to the originally requested page(s), future attempts to read data from such additional pages will have a significantly lower probability of failure, and overall system efficiency gains will be realized. In addition, the total number of costly repair events, which can interrupt system performance and impede overall system functionality, will be minimized with preemptive repairs of extended lists of pages, as opposed to repairing only those pages in the original data transfer request. For example, if a data transfer request relates to page A, and page A is found to be defective, page A may be repaired. However, if page B is later requested, and page B is also defective, a second repair, and consequential system downtime, will need to be effectuated to repair page B. If, instead, page B had been repaired at the same time as page A, the system would not undergo two separate costly repairs or correction actions.

Further, extending the number of pages for patching also attempts to cure situations in which a correction action cannot be resolved because the page that is actually defective is not known. Such situations arise, for example, where the originally requested page is not in fact defective but, instead, appears to be defective or unusable based on a combined or preemptively expanded data request that attempts to retrieve more pages than those originally requested. Combined or preemptively expanded data requests may be used to achieve better performance. For example, a request for page A and page C may be made. If pages A and C are related, for example, the I/O stack may perform only one read operation comprising A, B, and C for efficiency gain reasons. The data requestor is not aware that a combined read operation is being performed. As a result, if page B is a defective page, the extended read operation fails. However, upon receiving an indication of the failure of the read operation, the data requestor will determine that page A and/or page C are defective. If repairs are then made only to page A and page C, the read operation will continue to fail and will likely enter an infinite loop of failure. However, by applying an extended patching procedure that preemptively repairs all pages related to page A and page C, page B would also likely be repaired. The actual defective, although unknown, page(s) are thus repaired with extended patching, and the correction action is able to complete successfully.

In an embodiment, the defined number of additional pages comprises related additional pages, in which the determination of the pages that are deemed "related" correlates to the specific storage device technology or Input/Output (I/O) subsystem being used. For example, where the storage device comprises magnetic rotating platters, such as a magnetic-rotating-platter storage device, "related" pages will likely be those pages in the physical or logical vicinity of the originally requested page(s). Determining the physical or logical vicinities of related pages uses statistical distribution analyses in embodiments, in which a statistical probability of finding a defective page on a given physical region of a storage device is higher if there was a page(s) found to be unusable in the vicinity of the page. In another embodiment, pages are considered "related" based on an Input/Output (I/O) size, in which two pages are considered related if the logical offset distance between them is equal to, or less than, the I/O size or another determined number of bytes related to the I/O size. In yet a further embodiment, a determination of "related" pages is based on the use of historical data regarding error conditions occurring in areas related to the originally requested page. By keeping track of previous errors occurring in a certain portion of a disk array or track, for example, the determination of "related" pages may comprise those pages that were previously found to be erroneous as well. Encompassing such previously erroneous or problematic pages in the repair may eliminate false failures resulting from a combined data transfer request and avoid unresolved, or infinite loop, correction actions.

An example logical environment or system 100 for using an extended page patching procedure is shown in FIG. 1 in accordance with embodiments disclosed herein. Client computer 102 performs an action at client computer 104. For example, user 102 requests to read an electronic mail ("email") message at client computer 104. This request is transmitted over network 106 to server 108, in which server 108 processes the request by executing the application(s) related to the request. The execution of the application at server 108 triggers the database to retrieve the logical data portion(s) 118, e.g., page(s) 118, from database 116 over network 114. Such triggering of the database for retrieval of a page(s) occurs, in embodiments, through a database engine ("DBE") 120 that is part of server 108. In embodiments, any number of servers 108, 110, and 112 may be used, as shown by ellipses 110. Database engines 120 and 122, or storage engines 120 and 122, are software components used by a database or database management system to read, create, remove, and/or update data in a database. As such, in other embodiments, server 108 communicates with database 116 which comprises database engine 122 that stores and retrieves data in and from database 116. In such embodiments, database 116 comprises the database engine, i.e., software, and storage elements, such as a disk array, memory array, for example. In other embodiments, database engine 122 is its own computer system in and of itself, having access to a processor and memory. Communications with a database comprising a database engine may also include cloud computing services, according to further embodiments. In still further embodiments, database engine 120 may be part of server 108 and database engine 122 may be part of database 116, in which each database engine performs functions related to database data retrieval, storage, etc. Dashed lines 120 and 122 show the optional locations of database engine 120 and 122. Further, while FIG. 1 shows separate database 116, multiple, separate databases may be used in accordance with embodiments. Or, in other embodiments, a database or a plurality of databases may be directly attached to server 108, 110, 112, etc., as shown by the attached memory at server 108 and server 112. In such embodiments, the database may be accessible via Direct-Attached Storage ("DAS") architecture.

System 100 is not limited to any particular implementation and instead embodies any computing environment upon which the functionality of the environment described herein may be practiced. Further, networks 106 and 114, although shown as individual single networks may be any types of networks conventionally understood by those of ordinary skill in the art. In accordance with an example embodiment, the network may be the global network (e.g., the Internet or World Wide Web, i.e., "Web" for short). It may also be a local area network, e.g., intranet, or a wide area network. In embodiments, a network may be any system allowing communications between server(s), computer system(s), or other component(s). In accordance with embodiments, communications over networks 106 and 114 occur according to one or more standard packet-based formats, e.g., H.323, IP, Ethernet, and/or ATM.

Further, any type of environment or system can be used in accordance with embodiments of the present disclosure. FIG. 1 is offered as an example only for purposes of understanding the teachings of the embodiments disclosed herein. For example, FIG. 1 shows servers 108, 110, and 112. However, embodiments also cover any type of server, separate servers, server farm, or other message server. An example server, according to embodiments, is MICROSOFT EXCHANGE SERVER 2010 SP1. Further yet, FIG. 1 shows client computer 104. However, any type of small computer device can be used without departing from the spirit and scope of the embodiments disclosed herein. Indeed, environment or system 100 represents a valid way of practicing embodiments disclosed herein but is in no way intended to limit the scope of the present disclosure. Further, the example network environment 100 may be considered in terms of the specific components described, e.g., server, client, etc., or, alternatively, may be considered in terms of the analogous modules corresponding to such units.

Although only one client computer 104 is shown, for example, another embodiment provides for multiple small computer devices to communicate with server 108. In an embodiment, each small computer device communicates with the network 106, or, in other embodiments, multiple and separate networks communicate with the small computer devices. In yet another embodiment, each small computer device communicates with a separate network. Client computer 104 may be any type of device capable of performing the types of requests described herein, including, but not limited to, laptops, smartphones, netbooks, tablet computers, etc.

Figure 2:
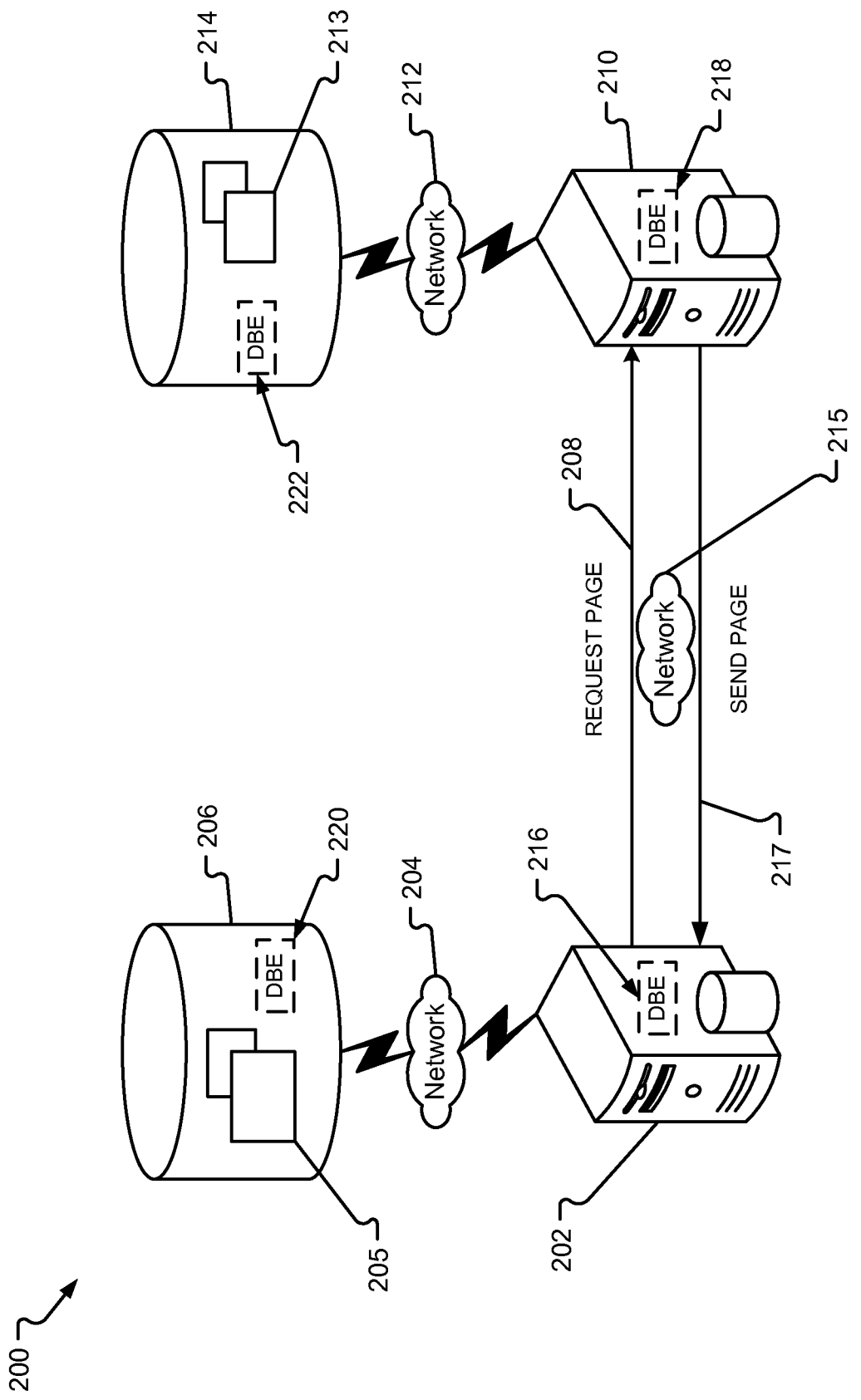
FIG. 2 depicts an example logical representation of an environment or system for retrieving a copy of a page from one computer data storage device to repair a similar or identical page in the requesting computer data storage device, such as the computer data storage device illustrated in FIG. 1, in accordance with embodiments disclosed herein.

While FIG. 1 shows example environment or system 100 for retrieving pages of a computer data storage device and performing page patching related thereto, FIG. 2 illustrates an example environment or system 200 for performing a repair, or correction action, on a defective page(s) of a computer data storage device by using an extended patching procedure, in accordance with embodiments disclosed herein. For example, server 202 comprising database engine 216 communicates with database 206 over network 204 to retrieve a page(s) 205 from database 206. Database engine 216 determines that the read operation from database 206 has suffered a read operation failure. As a consequence, database engine 216 determines the page or a list of pages to repair in database 206 and requests a page(s) 208 over network 215 from server 210. As discussed with respect to FIG. 1, database engine 220 may be part of database 206, etc., in which server 202 communicates with database engine 220 over network 204, in accordance with embodiments. If server 210 comprises a copy of database 206, server 210 retrieves the requested page(s) 213 over network 212 from database 214. Server 210 may comprise database engine 218, or, in other embodiments as discussed, database engine 222 may be part of database 214, etc. Upon retrieving the requested page(s) 213, server 210 sends or transmits the page(s) 217 to server 202. Database engine 216 or 220 then uses the page(s) to repair the defective page(s) in database 206. FIG. 2 thus depicts the patching of pages between two different database nodes. While two nodes are depicted in conceptual environment 200, any number of nodes may be used in accordance with embodiments disclosed herein. In other embodiments, the database engine(s) itself may store a backup copy or copies of an associated database, in which communications with another server/database system would not be necessary for retrieving copies of data portions for correction action. In further embodiments, the database engine(s) may correct the pages locally by applying correction techniques such as, but on limited to, Error Correction Code ("ECC") correction or by treating the failure as a data loss and writing blank pages over the failure after correcting the proper data structures. Conceptual representation or model 200 is offered for purposes of illustration only, in which the layout, terminology, etc. used are offered for example purposes only. Other architectures are contemplated within the scope of this disclosure. For example, rather than communicating with databases (e.g., databases 206 and 214) via a network, the databases may be connected in a DAS architecture. Furthermore, while embodiments of FIG. 2 have been described as detecting failures during a read operation, such detection may occur during other I/O operations such as, but not limited to, write operations.

Figure 3:
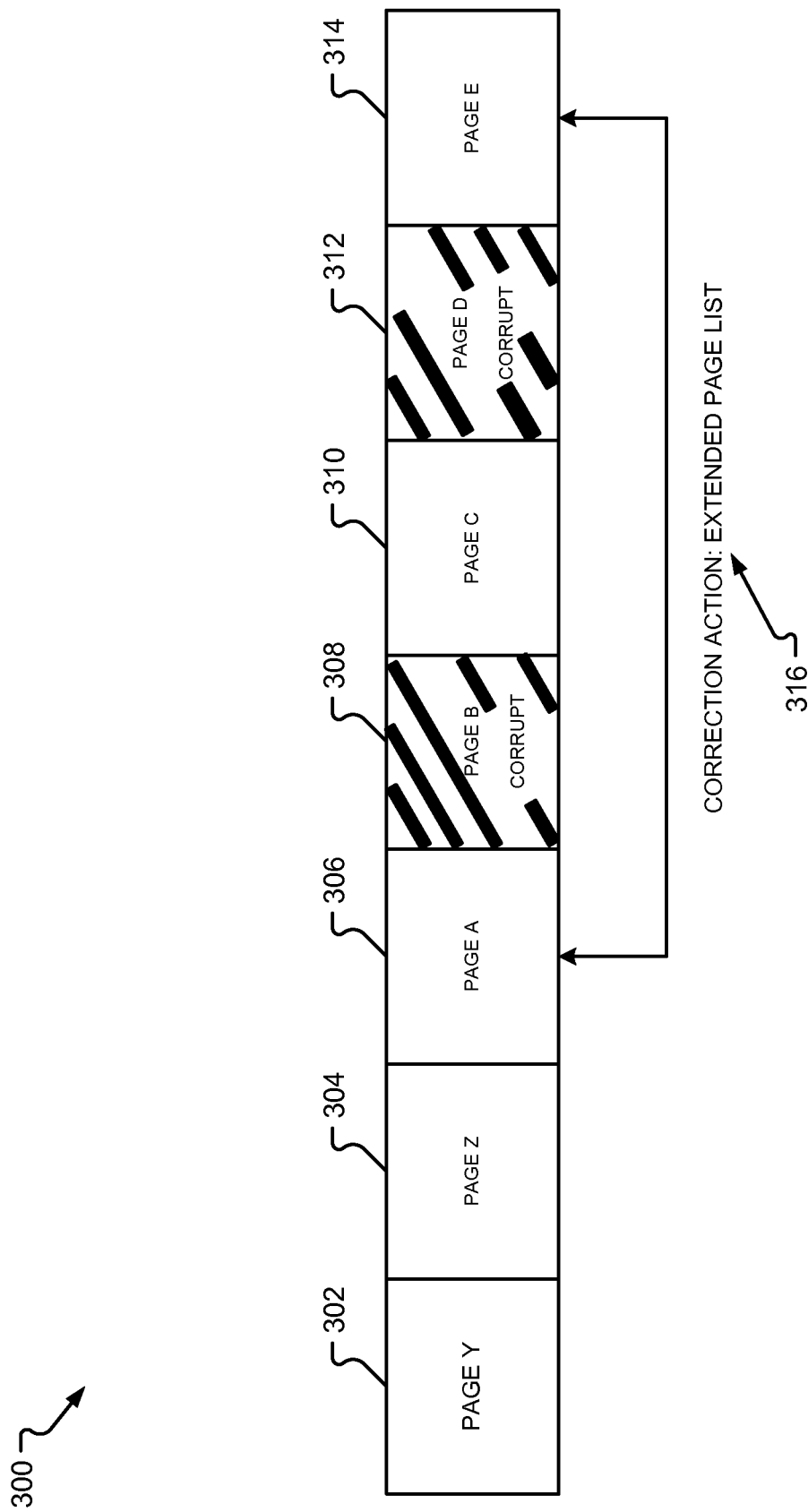
FIG. 3 illustrates an example conceptual representation of logical data portions of a computer data storage device, such as the computer data storage device depicted in FIG. 1, and a correction action involving an extended page list in accordance with embodiments disclosed herein.

In retrieving page(s) 205 and 213 in example environment or system 200, such page(s) may be unusable, e.g., corrupt or defective, in which FIG. 3 illustrates an example conceptual representation of logical data portions of a computer data storage device, such as the computer data storage device depicted in FIG. 1, and a correction action involving an extended page list in accordance with embodiments disclosed herein. Numerous types of computer data storage devices reasonably known to those of ordinary skill in the art may be used in accordance with embodiments disclosed herein. For example, computer data storage devices comprise: magnetic disks (including hard disks and hard disk drives, floppy disks, ZIP disks, devices including magnetic rotating platters), optical discs (including CD, DVD, Blue-ray Discs), minidisc, flash memory/memory card and flash memory drives (including USB flash drive), bubble memory (including magnetic bubble memory), magnetic tape, optical tape, etc. Embodiments thus relate to computer data storage devices that support page patching between separate nodes.

As discussed, a logical data portion of a computer data storage device may be referred to as a "page." Logical or conceptual representation 300 depicts Page Y 302, Page Z 304, Page A 306, Page B 308, Page C 310, Page D 312, and Page E 314. Page B 308 is depicted as corrupt or defective in FIG. 3. In retrieving Page B from a computer data storage device storing logical data portions 302-314, a failed read operation will likely occur as a consequence of Page B's corrupt state. In determining a correction action for repairing Page B, embodiments of the present disclosure provide for an extended page range to be repaired. Such extended page list 316 is shown in FIG. 3 as Pages A 306-E 314. As a consequence of repairing Pages A-E, corrupt Page D 312 is also repaired, even though Page D was not part of the original request for data transfer. Repairing Page D 312 preemptively will save system resources in the long run by not requiring a separate repair, or correction action, if and when Page D is requested in a subsequent data transfer request. Conceptual representation or model 300 is offered for purposes of illustration only, in which the layout, terminology, etc. used are offered for example purposes only. For example, representation 300 depicts related pages for determining the extended page list as including those pages within the physical or logical vicinity of the requested Page B 308. For storage devices based on magnetic rotating platters, for example, defective additional pages are often within the physical or logical vicinity of the original page. However, other storage devices may have related pages that are not within the physical or logical vicinity of the original page. FIG. 3 is offered for example purposes only.

Figure 4:
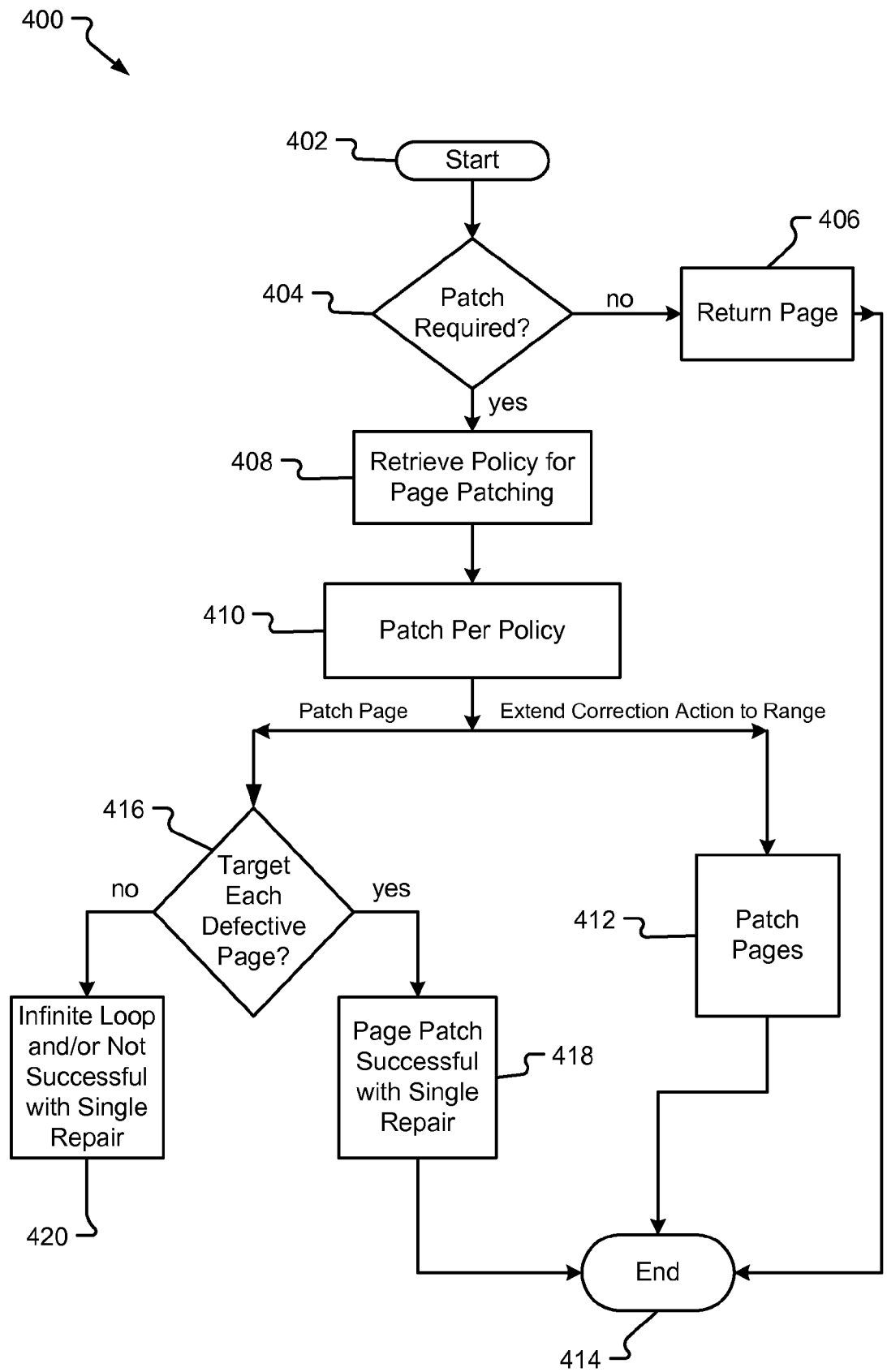
FIG. 4 depicts a flow diagram illustrating the operational characteristics of a process for retrieving a policy or logic for determining the correction action to apply to patch a page(s) in a computer data storage device in accordance with embodiments disclosed herein.

While FIG. 3 illustrates an example conceptual representation of logical data portions of a computer data storage device and a correction action involving an extended page list, FIG. 4 depicts the operational steps 400 for patching based on a policy or logic, including an extended patching procedure, in accordance with embodiments disclosed herein. START operation 402 is initiated, for example, with a request for a page(s) from a computer data storage device. The database engine and/or server determines whether a patch, or repair, of the requested page(s) is required at query 404. In embodiments, such determination is based on receiving an indication of a failed read operation. In other embodiments, the database engine and/or server itself determines a mismatch in the retrieved logical data portion and a stored logical data portion, such as through the use of a checksum algorithmic analysis of bytes retrieved, etc. If it appears that a defective, corrupt, or otherwise unusable page exists, process 400 proceeds YES to retrieve the policy or logic for page patching 408. In embodiments, such policy or logic is built-into the database engine, for example, in which the policy or logic dictates how the repair process, or correction action, 410 may occur. For example, the policy or logic may require that only the requested page(s) is patched. Or, the policy or logic may require that the correction action be extended to a range of a defined size. In such an embodiment, the policy or logic also includes the factors for determining the defined size of the extended range, in which such factors may include, Input/Output (I/O) size, statistical distribution, historical data, etc.

In a process where the policy or logic dictates that only the requested page(s) for the original data transfer be patched, process 400 branches to query 416 for determining whether each defective page in the request was targeted with the repair operation. For example, if Page A and Page C were requested, and Page A was defective, a repair of the originally requested pages, i.e., Page A and Page C, would result in a successful page patch with the single repair 418. Process 400 then terminates at END operation 414. However, if Page B is the defective page, and if Pages A, B, and C were requested in a combined or preemptive request, Page B would not be repaired with a page patch directed only to the originally requested pages of Page A and Page C. Page B would thus not be targeted for repair, and process 400 proceeds NO to an unsuccessful repair 420, in which an infinite loop of an unresolved correction action 420 may occur if the read operation for Page A and Page C keeps failing despite repeated repair efforts of these two pages.

On the other hand, in an embodiment of the present disclosure where the extended page list correction action applies, process 400 branches to patch pages 412 using the extended correction action for extended page patching. In a similar request to the example given above, the extended correction action may repair Pages A, B, and C even though the original request involved only Page A and Page C. Page B, the defective page, will thus also be repaired at patch pages 412, and process 400 terminates at END operation 414.

Referring back to query 404, if the original read operation is successful, no patch is required at query 404, and process 400 proceeds NO to return page operation 406, in which the requested page(s) are retrieved and, in embodiments, processed by the related application(s) running on the server. Upon returning the page(s) 406, process 400 terminates at END operation 414. FIG. 4 is an example of possible operational characteristics for patching a page(s) of a computer data storage device by applying a policy for such, in accordance with embodiments disclosed herein. Operational steps depicted may be combined into other steps and/or rearranged. Further, fewer or additional steps may be used, for example.

Figure 5:
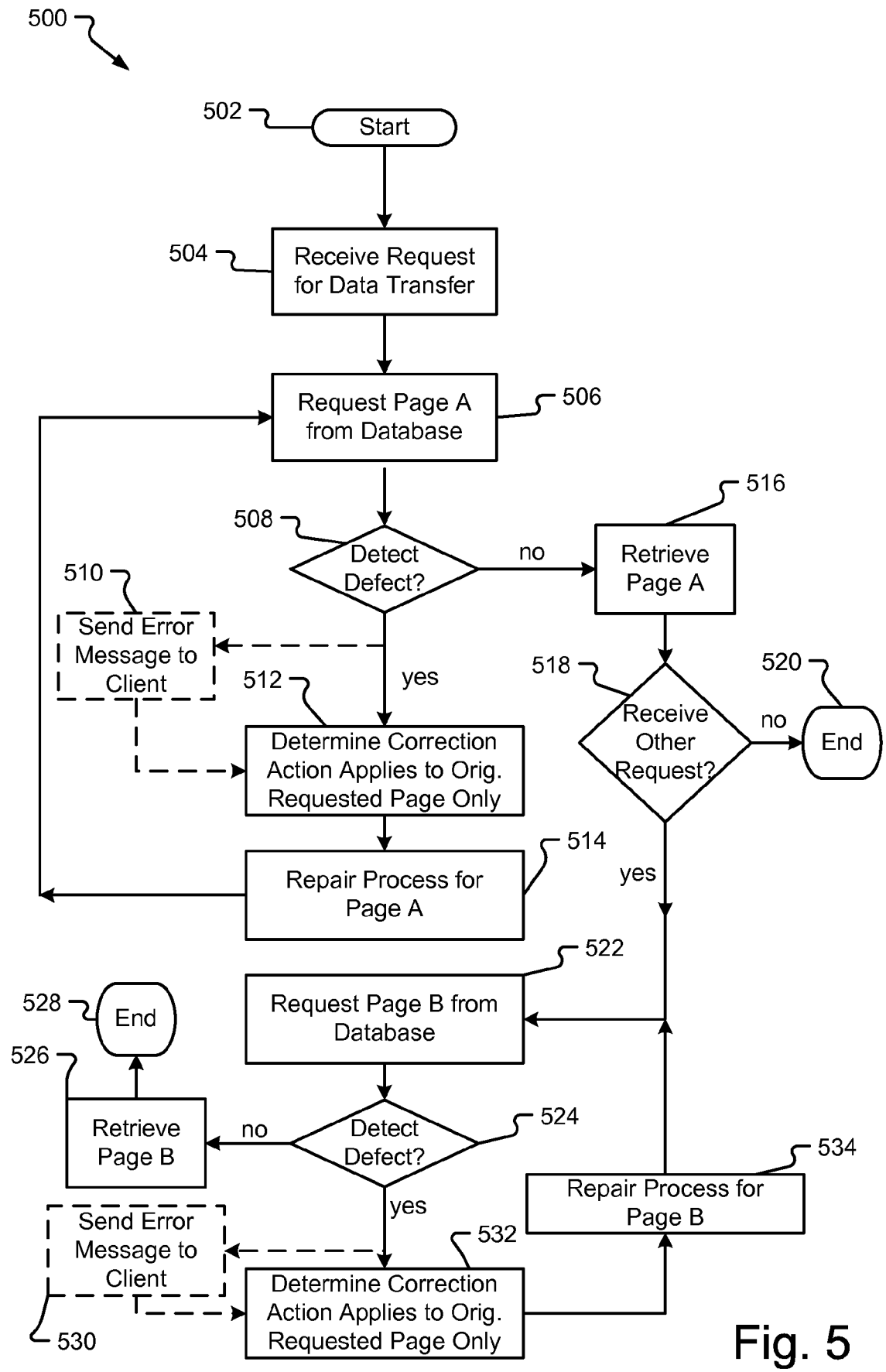
FIG. 5 illustrates a flow diagram depicting the operational characteristics of a conventional process for using a plurality of repair processes for patching a page(s) of a computer data storage device.

Next, FIG. 5 illustrates the operational characteristics of a conventional process 500 for patching pages using a policy or logic that requires patching of only the originally requested page(s), in which additional repair operations are required when a subsequent request for a related page is made. START operation 502 is initiated, and a request is received for data transfer, for example. Such request may be received at a server, such as server 108 in FIG. 1, as transmitted over a network from client computer 102, for example. Such request may cause the execution of an application for processing such a request at the server, for example. In turn, the server and/or database engine triggers the database to retrieve the requested data. The database engine, whether part of the server or separate from it, according to embodiments, requests a particular page, such as Page A, from the database through an internal mapping operation or other analysis for determining the data location at the computer data storage device, for example. Where the database engine is part of the server, for example, Page A is requested from the database 506. Next, query 508 determines whether a defect or corrupt page exists. For example, the server and/or database engine may receive an indication of a defective page and/or a failed read operation, according to embodiments. Alternatively, the database engine and/or server itself determines a mismatch in the retrieved logical data portion and a stored logical data portion, such as through the use of a checksum algorithmic analysis of bytes retrieved, etc. Where a defective page is detected, process 500 proceeds YES to determine the correction action to apply 512. The correction action to apply may be based on accessing a built-in policy or logic. In process 500, the correction action requires repair of the originally requested page(s) only 512, i.e., no extended list of additional pages is applied. The repair process is thus applied to Page A only 514, according to the example involving a request for Page A, and process 500 returns to request Page A from the database operation 506. Upon detecting a defect or failed read operation 508, process 500 may optionally proceed to send error message to client 510, in which the server, for example, sends an indication or message to the client computer informing of the failed read operation. Such error notice informs the client of repair operations and expected system downtime or reduced system performance, for example.

Returning to query 508, if no defect is detected, process 500 proceeds NO to retrieve operation 516, in which the originally requested page, e.g., Page A, is retrieved 516. Next, query 518 determines whether any other data transfer requests exist or have been received 518. If no other requests have been received, process 500 proceeds NO to END operation 520, and process 500 terminates. Where another request has been received 518, process 500 proceeds YES to request the next page request, e.g., Page B, from the database 522. Query 524 next determines whether a defect or failed read operation exists 524 in retrieving Page B from the database. If no defect is detected, Page B is retrieved 526, and process 500 terminates at END operation 528. If an unusable or corrupt page is detected 524, process 500 proceeds YES to optional step 530 for optionally sending an error message to the client 530 to inform the client of possible system downtime, performance reduction, bandwidth consumption for the repair process, etc. Following optional step 530 (or if the optional sending of the error message is not pursued, process 500 determines the correction action applies to the originally requested page only 532. In applying the correction action only to the originally requested page only 532, only Page B is repaired 534, and process 500 continues back to request Page B from the database operation 522. If Page B was successfully repaired at operation 534, query 524 should not detect any defects, and process 500 proceeds to retrieve Page B operation 526. Process 500 then terminates at END operation 528. As a consequence of applying the correction action to only the originally requested page, process 500 illustrates the need for separate, and multiple, repair processes for Page A and Page B. FIG. 5 is an example of possible operational characteristics for patching pages using a policy or logic that requires patching of only the originally requested page(s), in which multiple costly repair processes are required. Operational steps depicted may be combined into other steps and/or rearranged. Further, fewer or additional steps may be used, for example.

Figure 6:
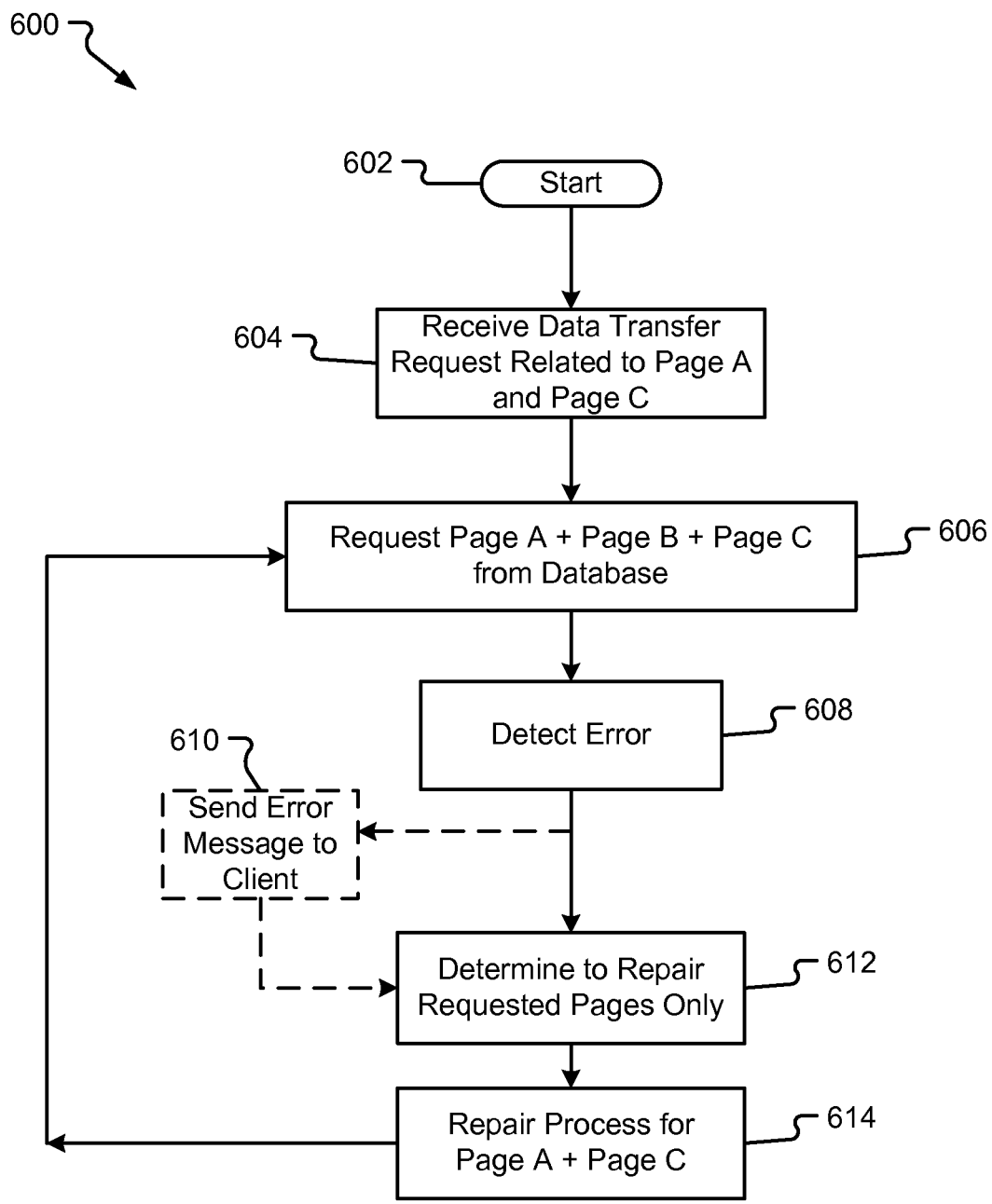
FIG. 6 depicts a flow diagram illustrating the operational characteristics of a conventional process for patching originally requested page(s) of a computer data storage device.

While FIG. 5 depicts a conventional process for patching only the originally requested page(s) of data transfer request, in which multiple repair operations are consequentially required, FIG. 6 illustrates a conventional process 600 for applying a correction action to repair only originally requested pages, in which an infinite loop of an unresolved correction action results. START operation 602 is initiated, and process 600 proceeds to receive data transfer request 604. Such data transfer request, for example, relates to a request for Page A and Page C, for example. While the data requestor, e.g., the database engine and/or server, may thus request Page A and Page C from the storage device, unbeknownst to the data requestor, a lower layer, such as the storage engine I/O subsystem, may extend the read operation to comprise Page B in addition to Pages A and C 606. If B is a defective or otherwise unusable page, an error is detected 608. An optional error message 610 may be sent to the client through the server and network. In a conventional process that repairs only the originally requested pages 612, i.e., not the extended read operation, the repair process is applied only to Pages A and C 614, for example. As a consequence, process 600 returns to request Pages A, B, and C, i.e., the extended read operation, 606, and steps 606 through 614 repeat in an infinite loop, in which the server, for example, repeats the request for data retrieval an infinite number of times. The correction action cannot be resolved in such a scenario because the page that is actually defective, e.g., Page B, is not ever repaired. Instead, the system uses resources to continuously repair intact, or valid, Pages A and C. FIG. 6 is an example of possible operational characteristics for patching pages using a policy or logic that requires patching of only the originally requested page(s) and that, consequently, leads to an infinite loop of an unresolved correction action. Operational steps depicted may be combined into other steps and/or rearranged. Further, fewer or additional steps may be used, for example.

Figure 7:
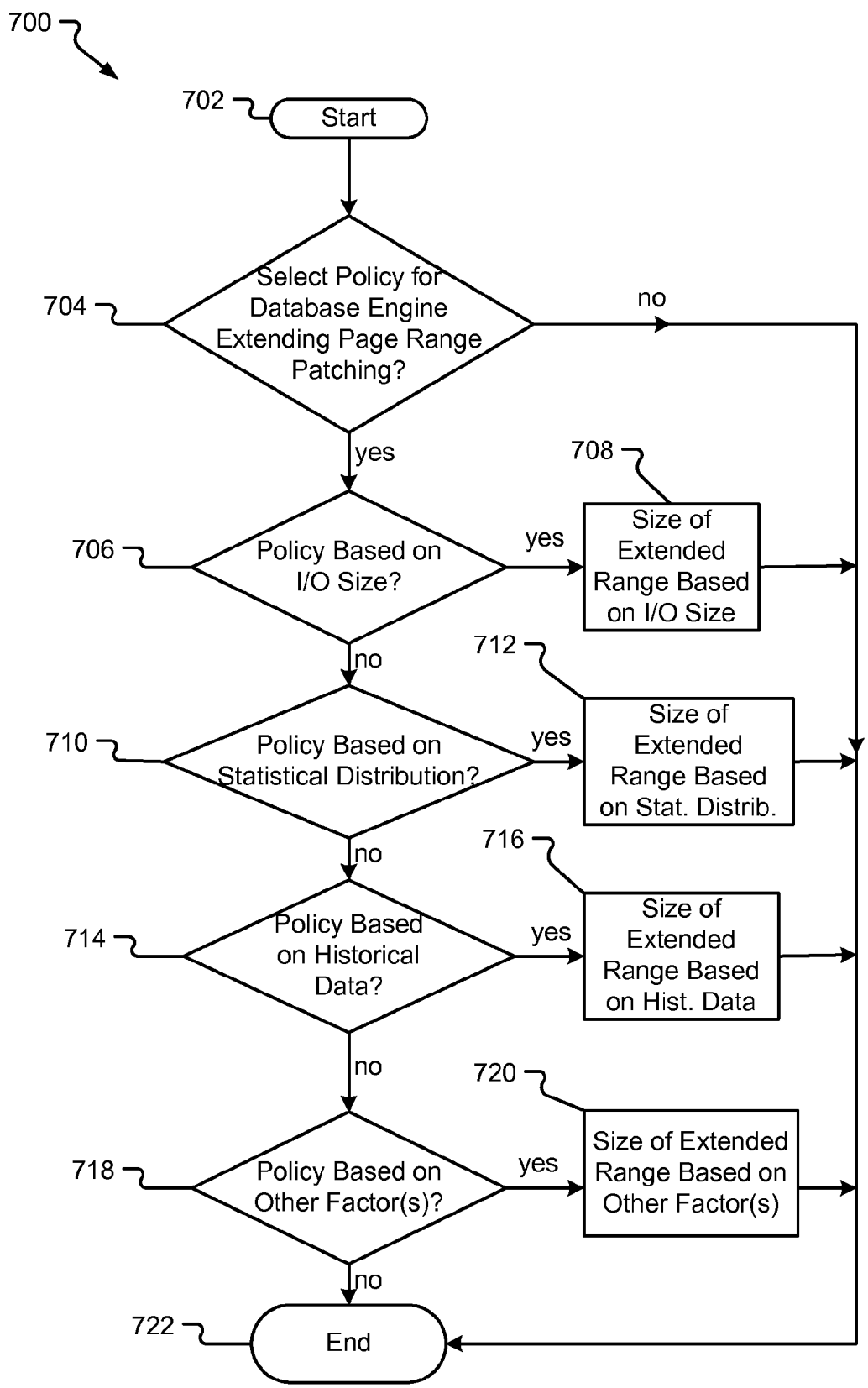
FIG. 7 illustrates a flow diagram depicting the operational characteristics of a process for selecting policy or logic for a database engine, or other computer data storage device or system, using an extended patching procedure in accordance with embodiments disclosed herein.

Turning to FIG. 7, the operational characteristics of a process 700 for selecting and/or creating policy or logic for a database engine, or other software component or system, using an extended patching procedure is shown in accordance with embodiments disclosed herein. START operation 702 is initiated, and process 700 proceeds to query 704 for determining whether it is desired to select a policy for a database engine or other software component that extends page patching. If no policy or logic is to be selected for extended patching, process 700 proceeds NO to END operation 722, and process 700 terminates. However, if policy is to be selected for extended page patching, in which pages in addition to those originally requested pages are automatically repaired, as discussed above, process 700 proceeds YES to query 706. Query 706 determines whether the policy is based on Input/Output (I/O) size, in which the defined size of the range for page patching is defined to be equal to, or less than, the I/O size, in example embodiments. The I/O size, in embodiments, is application-specific, and is determined by a programmer(s) writing an application at the time of programming the application itself. In other embodiments, the I/O size may be exposed to a system administrator as a configuration parameter that is tuned to achieve optimal performance. The policy or logic for determining the list of extended page patching thus uses the I/O size for the particular application and sets the extended list to a number of bytes equal to the I/O size, to a defined number of bytes within the I/O size, etc. For example, if a single I/O size for a given application is 256 kilobytes, in which such I/O size reflects the size before splitting into multiple I/Os, a list for page patching may be extended to 512 kilobytes to cover data portions before and after the apparently defective page. The I/O size is thus used for determining the amount of extra correction to apply. The specific technique of extending the list of pages for page patching is thus related to the type of storage device, according to embodiments. If the policy is to be based on I/O size, process 700 proceeds YES to operation 708 for selecting the policy based on the I/O size, and process 700 terminates at END operation 722.

If the policy is not to be based on I/O size, process 700 proceeds NO to query 710 for determining whether the policy or logic for defining the size of the extended list of pages is to be based on a statistical distribution analysis 710. A statistical distribution analysis may, for example, consider the pages within a physical or logical vicinity of the originally requested page(s), in which a higher statistical probability of finding a defective page on a given physical or geometric region of a storage device exists if unusable pages exist in the vicinity of the page. The higher probability is based on an increased likelihood that a page within the vicinity will undergo the same repair procedure as the originally requested page. If the policy is to be based on a statistical distribution analysis, process 700 proceeds YES to operation 712 in which a statistical based policy is selected, and process 700 terminates at END operation 722. If the policy is not to be based on statistical distribution analyses, process 700 proceeds NO to query 714.

Next, query 714 determines whether the policy is to be based on historical data about error conditions occurring in areas related to the page that was originally targeted for repair. For example, by keeping track of previous or current errors occurring in a certain portion of a disk array or track, for example, the determination of related pages may comprise those pages that were previously, or currently, found to be erroneous as well. Encompassing such erroneous or problematic pages in the repair may eliminate false failures resulting from a combined data transfer request and avoid unresolved, or infinite loop, correction actions. If the policy is to be based on historical knowledge 714, process 700 proceeds YES to operation 716 in which policy based upon historical data is selected, and process 700 then terminates at END operation 722. On the other hand, if the policy is not to be based on historical knowledge, process 700 proceeds NO to query 718, in which query 718 determines whether the policy or logic is to be based on other factor(s). If so, process 700 proceeds YES to base the policy or logic on such other factors 720, and process 700 terminates at END operation 722. If the policy or logic is not to be based on other factor(s), process 700 proceeds NO to END operation 722 and terminates.

Although process 700 shows various options for selecting policy for extended page patching and extending patching procedures, the various types of factors for selecting such policy, such as I/O size, statistical distribution, historical knowledge, etc., may also be combined such that the policy or logic is based on a combination of such analyses. For example, following each of steps 708-720, a separate query (not shown) may be made to determine whether to consider other factor(s) for adding to the policy or logic, instead of proceeding to END operation 722. Further, other factors than those listed in FIG. 7 may be considered in defining the policy or logic for extended page patching without departing from the spirit and scope of the present disclosure. FIG. 7 is an example of possible operational characteristics for selecting policy or logic for extended page patching. Operational steps depicted may be combined into other steps and/or rearranged. Further, fewer or additional steps may be used, for example.

Figure 8:
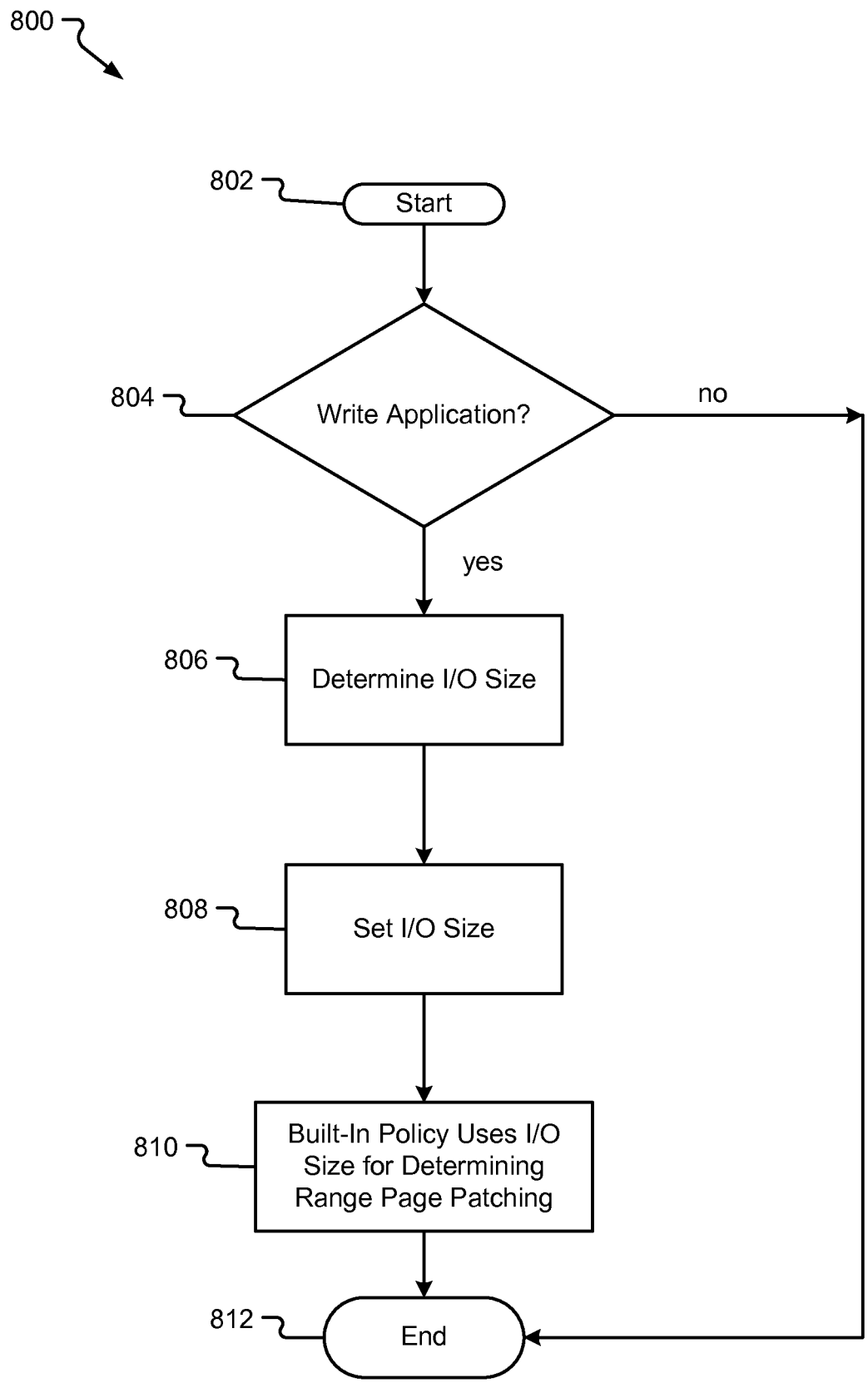
FIG. 8 depicts a flow diagram illustrating the operational characteristics of a process for setting an application's Input/Output (I/O) size, in which such Input/Output (I/O) size may be used in a policy for extended page patching in accordance with embodiments disclosed herein.

While FIG. 7 depicts the operational characteristics for selecting and/or creating policy or logic for extended page patching, in which FIG. 7 includes basing a policy or logic based on I/O size, FIG. 8 illustrates the operational steps of a process 800 for writing an application that sets the I/O size for a particular application. START operation 802 is initiated, and process 800 proceeds to query 804 for determining whether an application is being written. If NO, process 800 proceeds NO to END operation 810 and terminates. If an application is being written, process 800 proceeds YES to determine I/O size 806, and the I/O size 808 is set. The I/O size is thus application-specific. In an embodiment, a programmer, for example, writing the application and determining and setting the I/O size does not necessarily know that such size will be used by the database engine in determining extended page patching. In other embodiments, the programmer is aware of such use of the I/O size. A policy or logic built-into a database engine, for example, that uses I/O size for defining an extended list of pages for patching will thus use this I/O size in its determination of the list of page patching 810. Process 800 then terminates at END operation 812. FIG. 8 is an example of possible operational characteristics for writing an application that sets the I/O size for a particular application. Operational steps depicted may be combined into other steps and/or rearranged. Further, fewer or additional steps may be used, for example.

Figure 9:
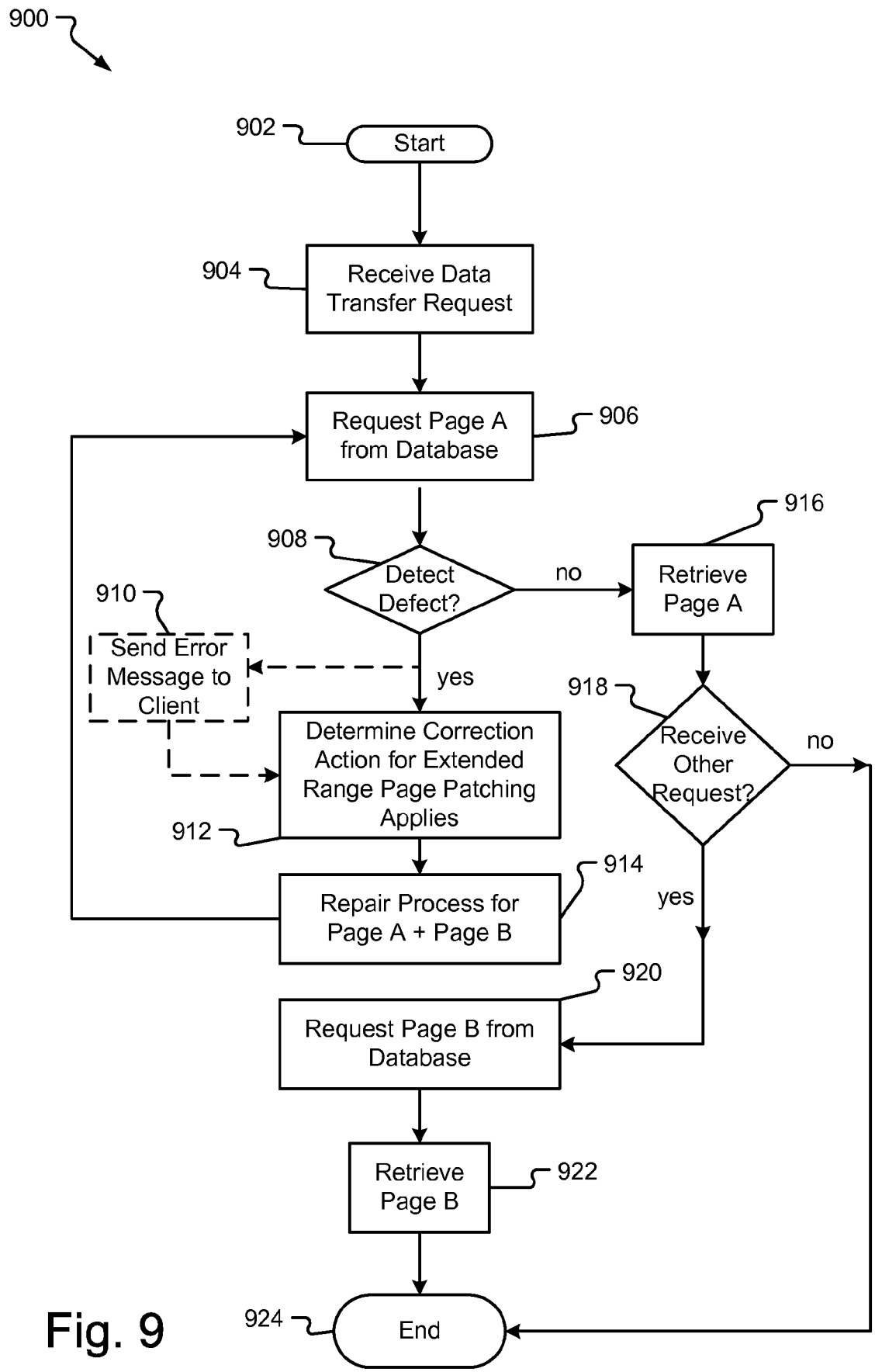
FIG. 9 illustrates a flow diagram depicting the operational characteristics of a process for applying a correction action involving an extended page list to patch pages of a computer data storage device in accordance with embodiments disclosed herein.

Turning to FIG. 9, the operational characteristics of a process 900 for applying an extended page patching procedure for a correction action is shown in accordance with embodiments disclosed herein. START operation 902 is initiated, and process 900 proceeds to receive request for data transfer operation 904. In an example embodiment, a server receives a request from a client over a network. The client, for example, sends the request to the server following the performance of an action by a user at a client computer. In another embodiment, the client computer initiates the request to the server. The request is to read an email message, for example, in which data relating to the email message is stored at a database. The server, upon receiving the request, executes an application, such as a mail application to process the request. In so doing, the database is triggered to retrieve the applicable page(s) relating to the request. Such triggering occurs through a database engine, in embodiments, which maps the request to the data storage location on the computer data storage device, or database. For example, a specific page, such as Page A, is requested for retrieval from the database 906. In an embodiment, such a request is made by sending a request from the database engine and/or server to perform a read operation from the computer data storage device or database. Next, it is determined whether a defect exists in the requested page. For example, a failed read operation may occur in an embodiment. Or, in another embodiment, an indication of an error in retrieving the requested page(s) may be sent by the database and received at the server and/or database engine. In yet another embodiment, the database engine and/or server itself determines a mismatch in the retrieved logical data portion and a stored logical data portion, such as through the use of a checksum algorithmic analysis of bytes retrieved, etc. If no defect is detected, process 900 proceeds NO to retrieve Page A operation 916. Query operation 918 next determines whether any other data transfer requests have been received, such as at the server and/or database engine, as sent by a client or another server computer, for example. If no other request has been received, process 900 proceeds NO to END operation 924, and process 900 terminates. If other requests have been received, process 900 proceeds YES to request the next logical data portion, e.g., Page B, from the database 920. Where Page B is not defective, corrupt, or otherwise unusable, process 900 proceeds to retrieve Page B operation 922, and process 900 terminates at END operation 924.

Returning to query 908, where a defect and/or failed read operation is detected, process 900 proceeds YES to optionally send error message indicating such failed operation and/or defect 910. Next, the correction action for repairing the defective page(s) is determined based on the policy built-into the database engine, for example. Process 900 shows that the correction action comprises extended page patching, in which pages in addition to those originally requested are included in the automatic repair operation 912. For example, Page B is included in the list for page patching, and the repair occurs automatically on Page A (originally requested) and Page B (extended list) 914. Process 900 next returns to operation 906 for requesting Page A from the database. If the repair process at operation 914 was successful, query 908 should show no defects or failures, in which process 900 proceeds to retrieve Page A operation 916. If other requests exist, such as for Page B, process 900 proceeds YES from query 918 to request Page B from the database. Because Page B has already been preemptively repaired according to the extended page patching procedure at operation 912, Page B is retrieved at operation 922 without the need for any additional, and costly, repair processes. Process 900 then terminates at END operation 924. FIG. 9 is an example of possible operational characteristics for applying a correction action involving an extended for page patching. Operational steps depicted may be combined into other steps and/or rearranged. Further, fewer or additional steps may be used, for example.

Figure 10:
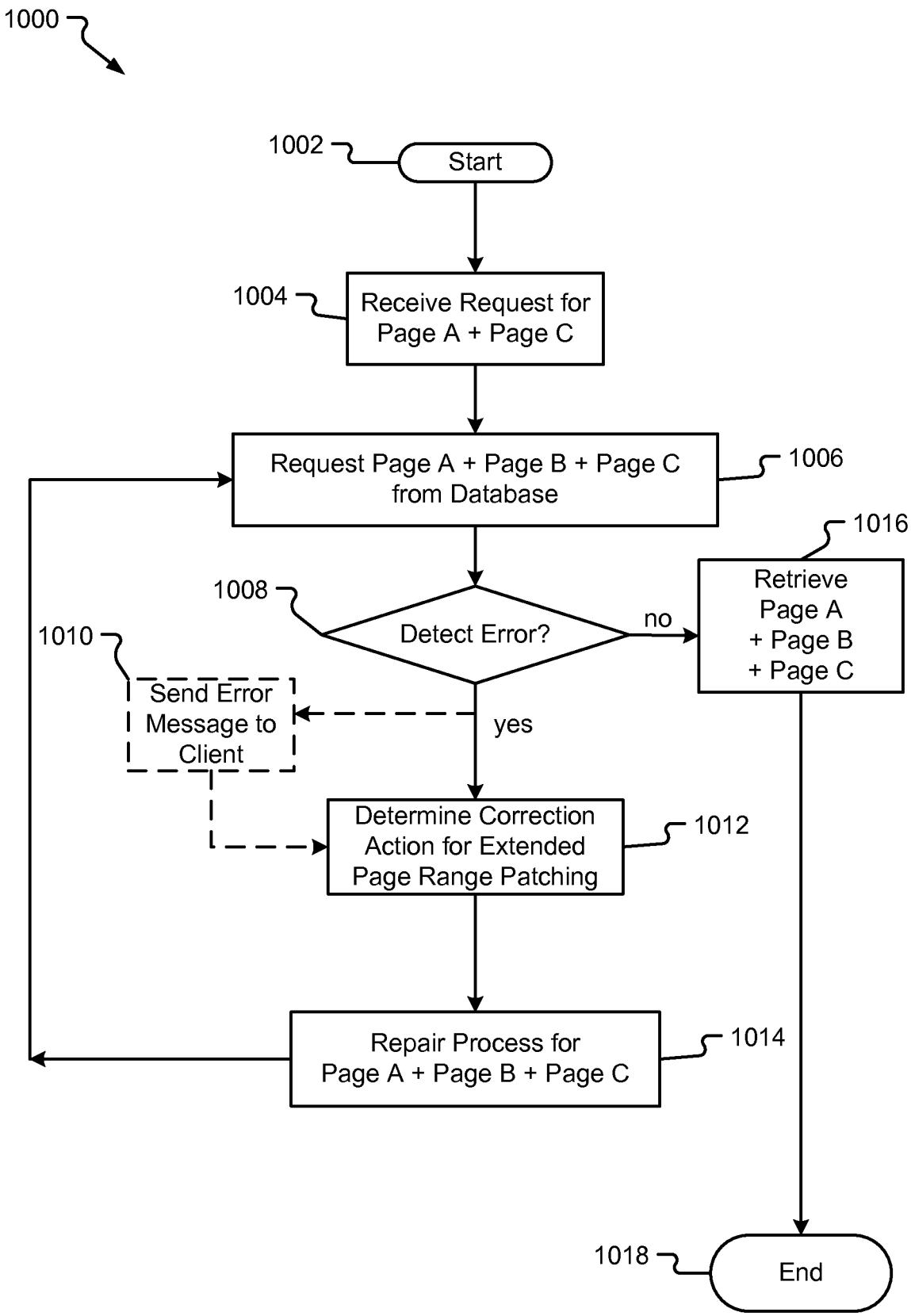
FIG. 10 depicts a flow diagram illustrating the operational characteristics of a process for using an extended page list procedure to patch pages of a computer storage device in accordance with embodiments disclosed herein.

While FIG. 9 shows the application of an extended page patching procedure to eliminate the need for multiple, and separate, repair processes through the use of preemptive repairs within the extended list, FIG. 10 depicts the operational steps of a process 1000 for applying a extended page patching procedure to avoid unresolved correction action scenarios involving infinite loops or cycles, in accordance with embodiments of the present disclosure. START operation 1002 is initiated with the performance of an action at a client computer or another server, in example embodiments. The performance of an action causes the server to execute an application related to the action, in which data is requested for the storage device. The database engine and/or server, in embodiments, thus determines to request Page A and Page C, for example, from the database. However, process 1000 shows that, unbeknownst to the data requestor, another layer of software, such as another subsystem of the I/O stack, may combine or preemptively extend the read operation from the database or computer data storage device to encompass Page B in addition to Pages A and C 1006. Next, query operation 1008 determines whether a defect, error, or otherwise failed read operation occurs. If such an error is detected, process 1000 proceeds YES to optional operation 1010 for sending an error message to the client, in which the server, for example, may send an error message to the client to notify the client of expected system downtime, reduced performance, inability to retrieve data, etc.

Next, the correction action for repairing the defect or corruption is determined at operation 1012, in which process 1000 shows that an extended patching procedure is applied 1012 according to the policy or logic of the database engine and/or server, for example. Because an extended list for page patching is applied, repair process 1014 is effectuated for Page B in addition to Pages A and C 1014. Following the repair process, a request is again made for an extended read operation of Page A, Page B, and Page C from the database 1006. If all pages were repaired successfully and no errors are therefore detected, process 1000 proceeds NO to retrieve operation 1016 for retrieving Pages A, B, and C. Process 1000 then terminates at END operation 1018. As shown in FIG. 1000, by applying an extended patching procedure that preemptively repairs all pages related to page A and page C, page B would also necessarily be repaired. Thus, if Page B was the defective page, extended page patching avoids infinite loops and unresolved correction actions, for example, because all related pages are preemptively repaired even though the data requestor may not know that the read operation was extended to Pages A, B, and C and that the defective page was, in actuality, Page B, a page that was not originally requested. FIG. 10 is an example of possible operational characteristics for applying a correction action involving an extended list for page patching. Operational steps depicted may be combined into other steps and/or rearranged. Further, fewer or additional steps may be used, for example.

Figure 11:
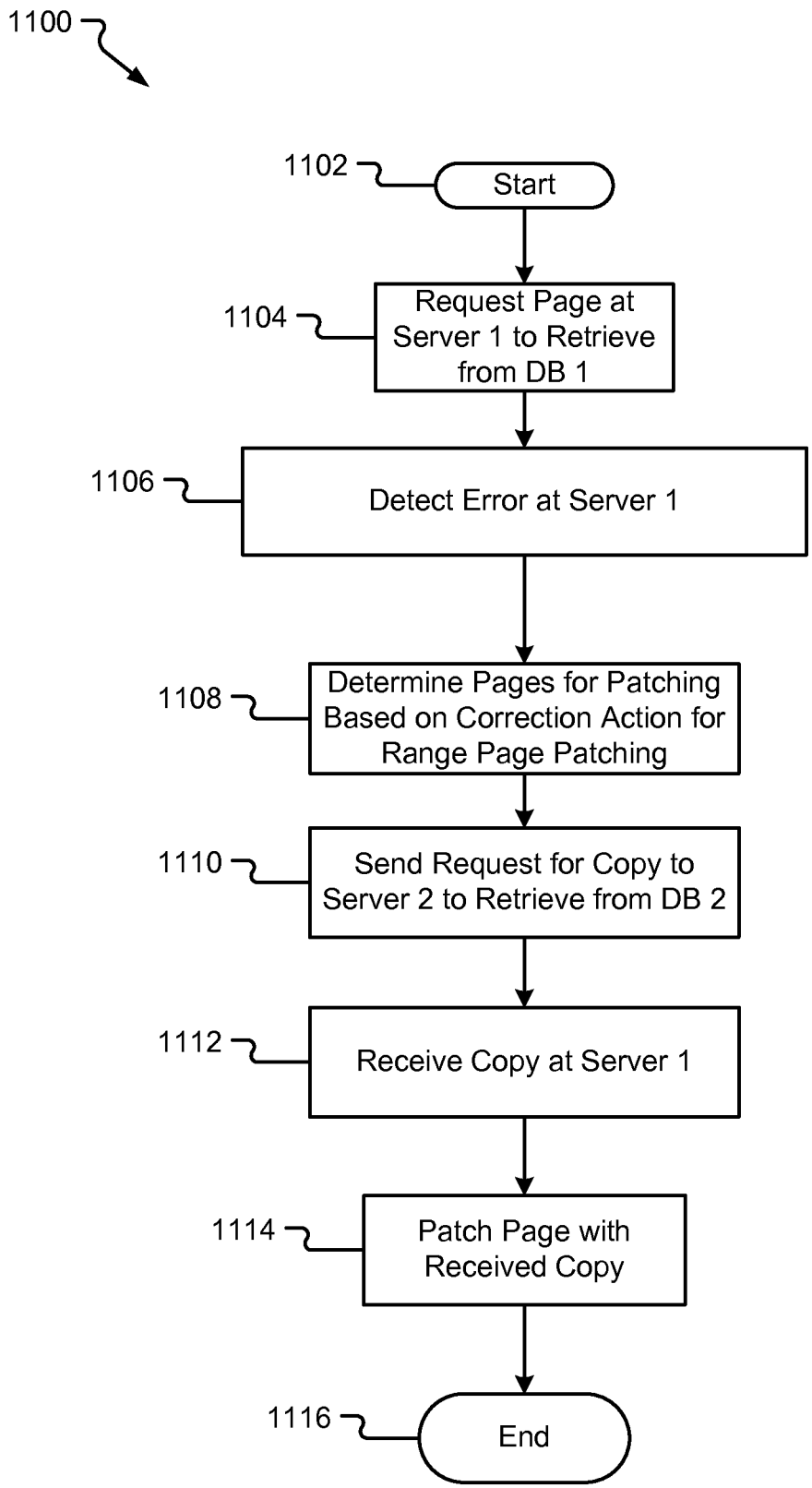
FIG. 11 illustrates a flow diagram depicting the operational characteristics of a process for repairing a page(s) of a computer storage device using an extended patching procedure in accordance with embodiments disclosed herein.

Next, FIG. 11 illustrates the operational characteristics of a process 1100 for performing a correction action, or repair, involving an extended page patching procedure where a logical data portion of a computer data storage device is found to be unusable, defective, and/or corrupt, in accordance with embodiments disclosed herein. START operation 1102 is initiated, for example, with a receipt of a data transfer request at a server, for example. According to an embodiment of the present disclosure, a server, such as a first server 202 depicted in FIG. 2, for example, through a database engine requests a page(s) to retrieve from a first database 1104. An error in the data retrieval from the database is detected at operation 1106. A determination is then made 1108 as to the page(s) to repair. In embodiments involving a correction action that comprises extended page patching based on an extended patching procedure, the determined pages for repair include pages in addition to those originally requested. The first server then sends, transmits, or otherwise communicates with a second server, such as server 210 in FIG. 2, to request the retrieval of copies of the pages to be patched 1110 from a second database, such as database 214 in FIG. 2, storing a copy of the first database, such as database 206 in FIG. 2, for example. In another embodiment, a backup copy of the database is stored on the database engine itself or, in another embodiment, in another database engine associated with the first database. Upon receiving the request for the copies, the second server retrieves the copies from the second database or database engine or other server or system, for example, and sends the copies to the first server. The first server thus receives the copies 1112. The pages determined for repair are then patched with the received copies. In an embodiment, the patching occurs through instructions provided by the database engine and/or server. An embodiment provides for the patching to replace the defective pages at the first database, while another embodiment provides for the defective or corrupt portions to be corrected based on the information provided in the received copies. Process 1100 then terminates at END operation 1116. FIG. 11 is an example of possible operational characteristics for performing a correction action or repair involving an extended page patching correction action, in accordance with embodiments disclosed herein. Operational steps depicted may be combined into other steps and/or rearranged. Further, fewer or additional steps may be used, for example.

Figure 12:
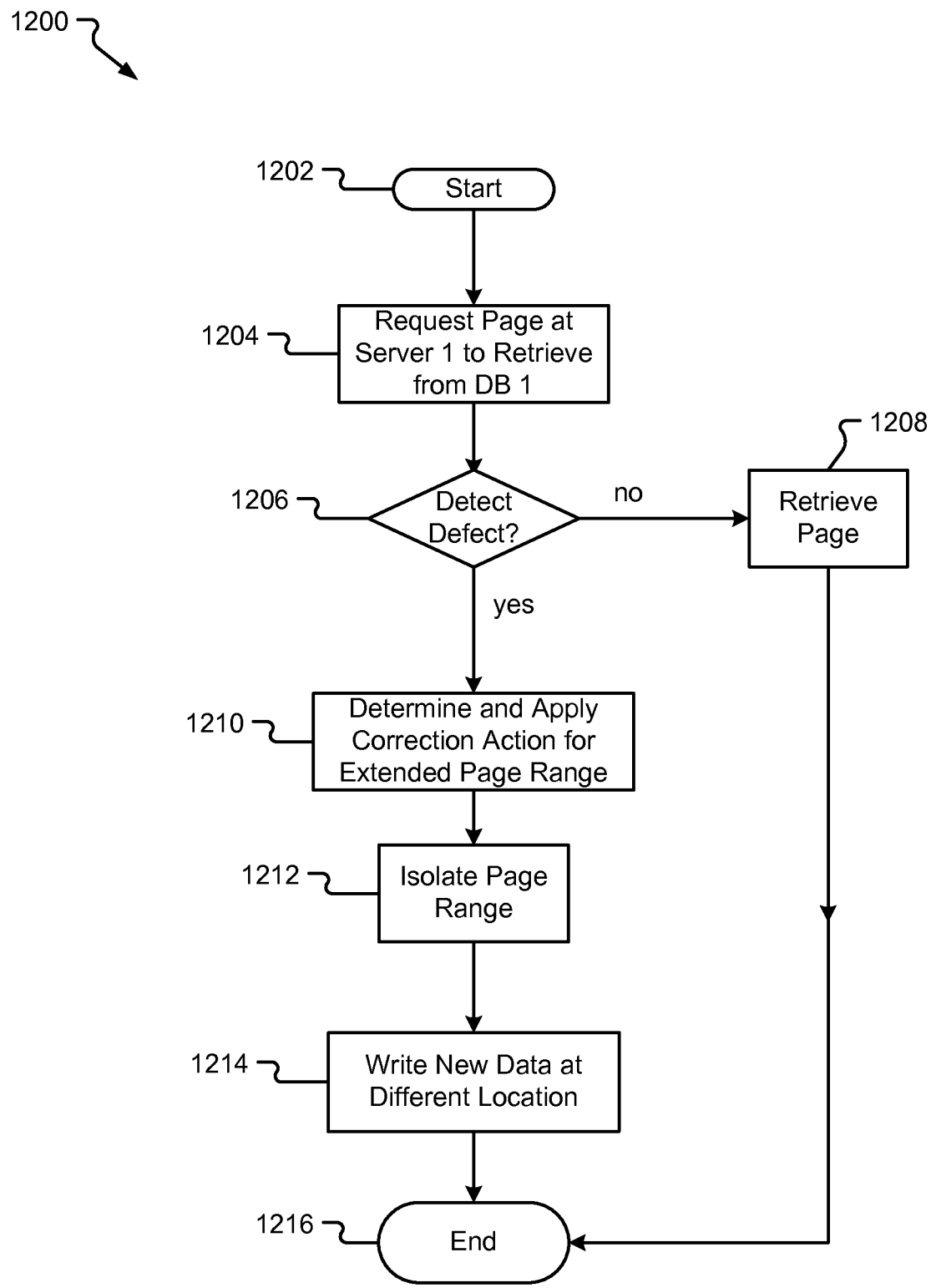
FIG. 12 depicts a flow diagram illustrating the operational characteristics of a process for isolating an extended list of pages of a computer storage device in accordance with embodiments disclosed herein.

While FIG. 11 depicts the operational steps for a process for performing a correction action or repair involving an extended page patching correction action, FIG. 12 illustrates the operational characteristics of a process 1200 for isolating a list of pages based on an extended page patching correction action, in accordance with embodiments disclosed herein. START operation 1202 is initiated, and process 1200 proceeds to request 1204 a logical data portion, or page, to retrieve from a first database, such as database 206 depicted in FIG. 2. In embodiments, such a request is made by a server and/or database engine, such as server 202 and database engine 216 shown in FIG. 2, for example. Query 1206 next determines whether a defect exists in a logical data portion of the computer data storage device. Such a defect may be the result of a corrupt or defective page causing a failed I/O operation, such as a read operation. If no defect is detected, process 1200 proceeds NO to retrieve page operation 1208, in which the requested page(s) is retrieved from the storage device for processing and/or sending to a client computer, another server, another computer system, etc. Process 1200 then terminates at END operation 1208.

If a defect or corruption in the requested data portion is detected at query 1206, process 1200 then proceeds YES to determine the list of pages for applying a correction action 1210, in which an extended patching procedure includes pages in addition to those originally requested in the original data transfer request. Upon determining and applying the list of pages to which to apply a correction action, process 1200 proceeds to isolate the determined list of pages 1212, in which the database engine and/or server isolates the defined page listing at the computer data storage device. Isolating the corrupt or defective data prevents future failed attempts to retrieve data from such locations. New data, instead, is written to a different location 1214. For example, copies of the isolated data may be obtained from a backup database or from another database holding a copy of the database. Such copies may be obtained through communications between a first server and a second server, for example. In another embodiment, a backup copy is obtained from the database engine itself or from a database accessed through cloud computing services, for example. In embodiments, the corrupt or defective data is corrected locally using a correction technique, such as ECC. Process 1200 then terminates at END operation 1216. FIG. 12 is an example of possible operational characteristics for performing a correction action involving an extended page patching correction action that isolates the defined range of pages, in accordance with embodiments disclosed herein. Operational steps depicted may be combined into other steps and/or rearranged. Further, fewer or additional steps may be used, for example.

Figure 13:
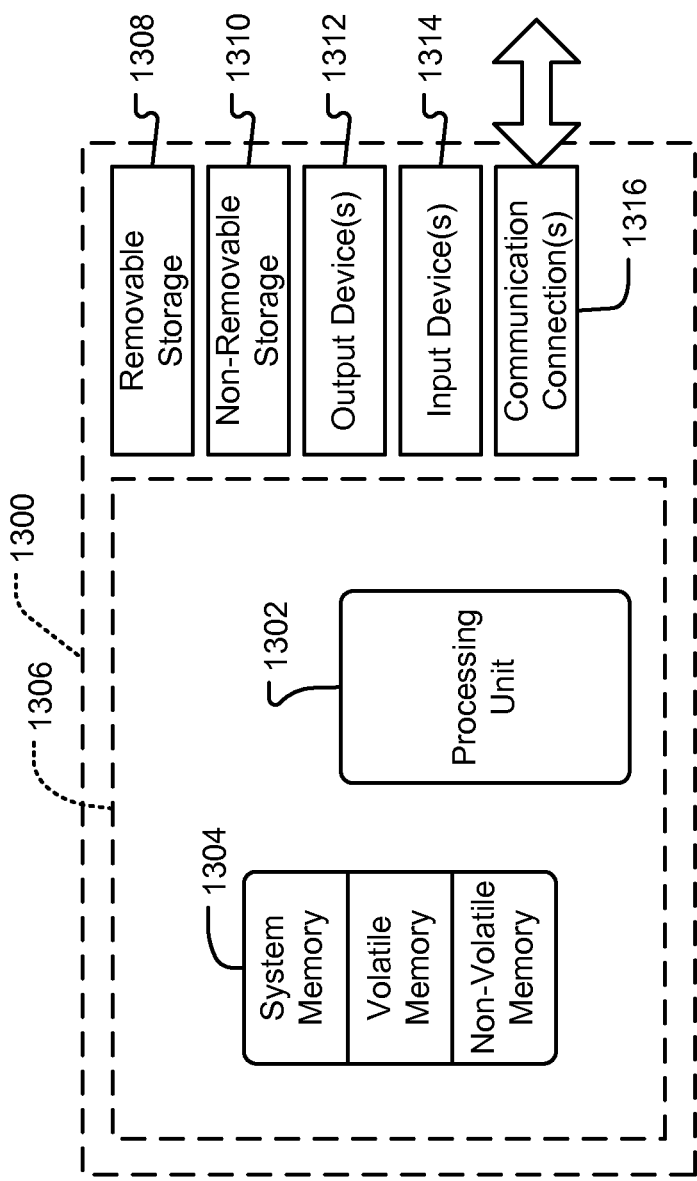
FIG. 13 illustrates an example computing system upon which embodiments of the present disclosure may be implemented.

Finally, FIG. 13 illustrates an example computing system 1300 upon which embodiments disclosed herein may be implemented. A computer system 1300, such as client computer 104 or server 108, which has at least one processor 1302 for exchanging message data as shown in FIG. 2, is depicted in accordance with embodiments disclosed herein. The computing system 1300 has a memory 1304 comprising, for example, system memory, volatile memory, and non-volatile memory. In its most basic configuration, computing system 1300 is illustrated in FIG. 12 by dashed line 1306. Additionally, computing system 1300 may also include additional storage (removable and/or non-removable) including, but not limited to, magnetic or optical disks or tape. Such additional storage is illustrated in FIG. 13 by removable storage 1308 and non-removable storage 1310.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1304, removable storage 1308, and non-removable storage 1310 are all computer storage media examples (i.e., memory storage.) In addition to the example computer data storage devices described above, computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing system 1300. Any such computer storage media may be part of computing system 1300. The illustration in FIG. 13 is intended in no way to limit the scope of the present disclosure.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Computing system 1300 may also contain communications connection(s) 1316 that allow the device to communicate with other devices. Additionally, to input a request at a client computer using a User Interface (UI) on client computer 104, for example, as provided by a corresponding UI module (not shown) on client computer 104, for example, in accordance with an embodiment of the present disclosure, computing system 1300 may have input device(s) 1314 such as a keyboard, mouse, pen, voice input device, touch input device, etc. Output device(s) 1312 such as a display, speakers, printer, etc. may also be included. All of these devices are well known in the art and need not be discussed at length here. The aforementioned devices are examples and others may be used.

Having described embodiments of the present disclosure with reference to the figures above, it should be appreciated that numerous modifications may be made to the embodiments that will readily suggest themselves to those skilled in the art and which are encompassed within the scope and spirit of the present disclosure and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific structures, features, acts, and/or media described above are disclosed as example forms of implementing the claims. Aspects of embodiments allow for multiple client computers, multiple servers, multiple database engines, multiple databases, multiple networks, etc. Or, in other embodiments, a single client computer with a single server, single database engine, single database, and a single network are used. One skilled in the art will recognize other embodiments or improvements that are within the scope and spirit of the present disclosure. Therefore, the specific structure, acts, or media are disclosed as example embodiments of implementing the present disclosure. The disclosure is defined by the appended claims.

What is claimed is:

1. A computer-implemented method for automatically patching pages of a first computer data storage device using an extended patching procedure, the method comprising:
   requesting, by a first server, a first page from the first computer data storage device;
   determining the first page is defective;
   selecting a policy for patching the first page; and
   based on the selected policy, determining a list of additional pages to be patched using the extended patching procedure.

2. The method of claim 1, wherein the determining the first page is defective is based on receiving an indication of a failed I/O operation or the requesting of the first page from the computer data storage device.

3. The method of claim 1, wherein the list of pages to be patched comprises the first page, a second page, and a third page.

4. The method of claim 3, further comprising:
   requesting copies of the first page, the second page, and the third page from a second server in communication with a second computer data storage device having a copy of the first page, the second page, and the third page;
   receiving copies of the first page, the second page, and the third page;
   transmitting the first page, the second page, and the third page to the first computer data storage device for repair.

5. The method of claim 3, further comprising:
   performing an error correction action on the first page, the second page, and the third page, wherein performing the error correction action comprises at least one of:
   performing an error correction technique;
   requesting a local copy of the first page, the second page, and the third page; and
   writing blank page data over the first page, the second page, and the third page.

6. The method of claim 1, further comprising:
   isolating the list of pages of the first computer data storage device.

7. The method of claim 1, wherein the extended patching procedure extends a correction action to a defined size.

8. The method of claim 7, wherein the defined size is based on an Input/Output (I/O) size.

9. The method of claim 7, wherein the defined size is based on a statistical distribution of pages in a logical or physical vicinity of the first page.

10. A computer-implemented method for automatically patching pages of a first computer data storage device using an extended patching procedure, the method comprising:
    receiving, at a first server, a request for data;
    determining the request for data comprises a first page from the first computer data storage device;
    sending a request to perform a read operation from the first computer data storage device;
    receiving an indication that the read operation failed;
    selecting a policy for patching the first page; and
    based on the selected policy, determining an extended list of pages to be patched;
    sending a request for copies of the extended list of pages to a second server; and
    receiving the requested copies of the extended list of pages.

11. The method of claim 10, wherein the extended page patching procedure extends a correction action to a defined size.

12. The method of claim 11, wherein the defined size is based on an Input/Output (I/O) size.

13. The method of claim 11, wherein the defined size is based on a statistical distribution of pages in a logical or physical vicinity of the first page.

14. The method of claim 11, wherein the defined size is based on historical data about error conditions occurring in areas related to the first page.

15. The method of claim 10, wherein the sending a request to perform a read operation comprises a request to perform a read operation of the first page and a second page, wherein the extended list of pages includes a third page.

16. The method of claim 15, wherein the receiving an indication that the read operation failed occurs in response to a defective second page.

17. A system for extending page patching of a first computer data storage device, the system comprising:
    a database operable to store data;
    a server, wherein the server comprises:
       memory coupled to at least one processor, the memory comprising computer program instructions executable by the at least one processor; and
       the at least one processor, wherein the at least one processor is operable to execute one or more components comprising:
          a database engine, wherein the database engine is operable to:
             request a first page from the first computer data storage device;
             determine the first page is defective; and
             select a policy for patching the first page; and
             based on the selected policy, determine a list of pages to be patched, wherein the list of pages extends beyond the first page.

18. The system of claim 17, wherein the extended list of pages comprises the first page and at least a second page.

19. The system of claim 18, wherein the extended list of pages is determined based on an Input/Output (I/O) size of the system.

20. The system of claim 18, further comprising:
    correcting the extended list of pages, wherein the correcting comprises retrieving valid copies of the first page and the second page from a second computer data storage device.

* * * * *